United States Patent [19]

Ashida

[11] 4,426,714

[45] Jan. 17, 1984

[54] CLOCK SIGNAL DERIVATION SYSTEM

[75] Inventor: Akira Ashida, Yokohama, Japan

[73] Assignee: Hitachi, Ltd., Tokyo, Japan

[21] Appl. No.: 229,755

[22] Filed: Jan. 29, 1981

[30] Foreign Application Priority Data

Jan. 29, 1980 [JP] Japan ................................ 55-8306

[51] Int. Cl.³ ...................... H04L 7/00; H03K 5/156
[52] U.S. Cl. ...................................... 375/110; 375/87
[58] Field of Search ...................... 375/87, 110, 104;
360/41-43, 44

[56] References Cited

U.S. PATENT DOCUMENTS

| | | | |
|---|---|---|---|
| 3,112,363 | 11/1963 | Schramel et al. | 375/110 |
| 3,611,161 | 10/1971 | Claxton | 375/110 |
| 3,619,505 | 11/1971 | Meile | 375/110 |
| 3,727,202 | 4/1973 | Fort | 360/42 |
| 3,745,248 | 7/1973 | Gibson | 375/110 |
| 3,949,394 | 4/1976 | Kennedy | 360/42 |
| 4,267,595 | 5/1981 | Hernandez | 360/43 |
| 4,363,002 | 12/1982 | Fuller | 375/87 |

Primary Examiner—Marc E. Bookbinder
Attorney, Agent, or Firm—Antonelli, Terry & Wands

[57] ABSTRACT

A clock deriving system is disclosed. At a base radio station, data is converted to a Manchester code and modulated into an FM, PM or AM radio wave. This radio wave is received by the antenna of a radio receiving apparatus and amplified and demodulated by radio receiver of the apparatus into the base band signal of the Manchester code form. This signal is amplified and sliced by a limiter amplifier and then supplied to a clock derivation circuit where an effective clock component is derived. This clock component is passed through a filter of a necessary clock frequency band, from which clock information is produced. This clock information is applied to a phase detector where the output clock signal from a digital PLL and the input clock information are compared in phase, that is, detection is made of whether the former is ahead of or behind the latter. If the former signal is ahead of the latter, the phase detector produces "1", whereas if the former is behind the latter, the detector produces "0". As a result, the digital PLL adjusts the phase of the incorporated clock oscillator therein, thereby deriving the clock signal of the input data.

6 Claims, 9 Drawing Figures

4,426,714

CLOCK SIGNAL DERIVATION SYSTEM

BACKGROUND OF THE INVENTION

1. Field of the Invention

The present invention relates to clock signal derivation systems used in the receiving section of a data transmission system, and more particularly to a clock signal derivation system for deriving a clock signal from a Manchester coded signal or the like having a clock frequency of twice the bit rate.

2. Description of the Prior Art

For deriving clock information from an input signal of base band in a digital transmission, there have been proposed two types of systems; use of a full-wave rectified signal (analog operation) and use of transition points on waveform (differentiated waveform) (digital operation). However, these methods have a drawback. When a Manchester coded signal of twice the information rate, binary AMI (Alternate Mark Inversion) coded signal or split phase coded signal is used for a base band signal, there is a possiblity in the above two methods, that phase inverted clock information is detected as correct clock information. This is caused by the fact that in a method using a full-wave rectified signal, positive and negative waves are asymmetrically rectified and in the method of using transition points in the waveform, unwanted waves are passed due to the characteristics of the of the succeeding stage of clock wave filter and amplifier.

SUMMARY OF THE INVENTION

The present invention relates to a clock signal derivation system for deriving clock components from input digital data.

Coded signals having digital transmission waveforms which change more rapidly than an information transmission rate (hereinafter referred to as a bit rate), such as a Manchester code (hereinafter referred to as a MC code) or a binary alternate mark inversion (AMI) code (hereinafter referred to as a 2AMI code), include unwanted clock components in clock components corresponding to transition points of the transmission waveforms.

FIG. 1 shows a time chart which illustrates the relationships between typical coded information and clock components thereof.

As shown in FIG. 1, an NRZ (non-return-to-zero) code does not include an unwanted clock component while the MC and the 2AMI code include the unwanted components NC but they can have much more clock components than the NRZ code can.

In prior art clock signal derivation systems, it has been difficult to derive stable and effective clock signals while eliminating the unwanted clock components in an economic way with a simple circuit construction.

It is an object of the present invention to provide a clock derivation system which can derive effective clock signals while eliminating unwanted clock components with a simple circuit construction. It is a feature of the clock signal derivation system of the present invention to produce transition point signals representing transition points of the wave form of the input data, and to extract from them signals with no adjacent intervals shorter than 50% of one bit period by applying gating signals having a width which starts from previously extracted transition point signals indicating transition points of the input data and lasts more than 50% and less than 100% of one bit period, and utilizes the extracted signals as clock information signals.

It is a second feature of the present invention to generate said gating signals by counting high frequency clocks of higher frequency than a bit rate of the input data by a counter of a predetermined count starting from the transition point signal and to use output signals from the counter as the gating signals.

DESCRIPTION OF THE PREFERRED EMBODIMENTS

Figure 2:
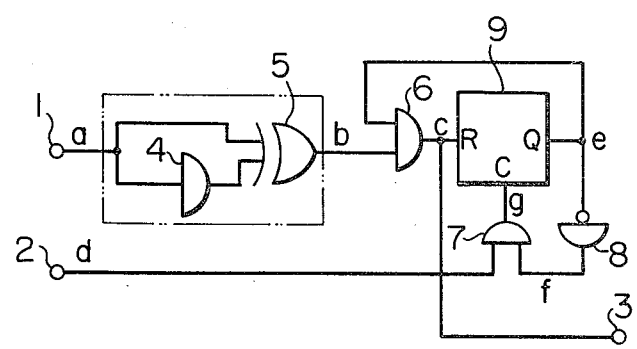
FIG. 2 shows a block diagram of one embodiment of the clock signal derivation system in accordance with the present invention.
Figure 3:
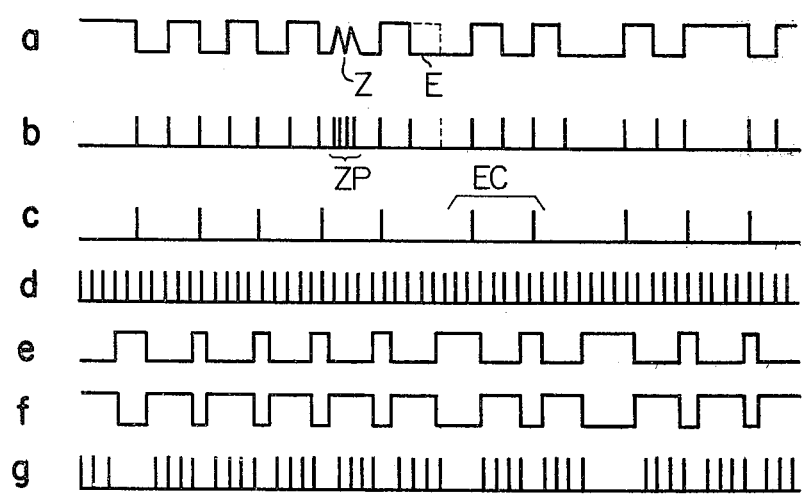
FIG. 3 shows a time chart thereof.

FIG. 2 shows a block diagram of one embodiment of the clock signal derivation system in accordance with the present invention and FIG. 3 shows a time chart thereof in which the MC is employed as the coding system.

Referring to FIG. 2, numeral 1 denotes a data input terminal, numeral 2 denotes a high frequency clock input terminal to which a clock signal having a higher frequency than the bit rate of the input data is applied, numeral 3 denotes a clock signal output terminal from which an extracted clock signal is produced, numeral 4 denotes a delay element of a differentiating circuit, numeral 5 denotes an exclusive OR gate of the differentiating circuit, numerals 6 and 7 denote AND gates, numeral 8 denotes an inverter and numeral 9 denotes a gating signal generating means comprising a counter.

Symbols a–g in FIG. 3 represent waveforms at points a–g shown in FIG. 2.

Referring to FIGS. 2 and 3, the operation of the present embodiment will be explained.

Transition points on an input data waveform a which is applied to the data input terminal 1 are detected by the differentiating circuit comprising the delay element 4 and the exclusive OR gate 5 to produce transition point signal pulses (waveform b).

When an output terminal Q (waveform e) of the counter 9 assumes "0", it is inverted by the inverter 8 (waveform f) so that the AND gate 7 is opened. Consequently, the high frequency clock (waveform d) from the high frequency clock input terminal 2 is gated through the gate 7 (waveform g) and applied to a clock terminal c of the counter 9.

The counter 9 counts the high frequency clock until the count thereof reaches a predetermined count N (the selection of the count will be discussed hereinlater), when the output terminal Q changes to "1". As a result, the AND gate 6 is opened. When a subsequent transition point signal pulse is applied to a reset terminal R (waveform c), the output terminal Q immediately changes to "0".

When the output terminal Q of the counter 9 assumes "1," the AND gate 7 is closed to prevent the high frequency clock from being applied to the clock terminal C of the counter 9 and hold "1" at the output terminal Q until the next transition point signal pulse reaches the reset terminal R.

By virtue of the gating signal derived from the counter 9, the output of the AND gate 6 (waveform c) produces a desired clock signal which is free from the unwanted clock components, which signal is taken out of the clock signal output terminal 3.

The predetermined count N of the counter 9 is selected such that $$T_D/T_C > N > (T_D/T_C)/2$$

where $T_D$ is a bit period of the input data and $T_C$ is a period of the high frequency clock. In this manner, the gating signal which make it possible to eliminate the unwanted clock components can be generated.

In the present embodiment, if an initial value of the output terminal Q of the counter 9 is "0" at the time of the power-on of the circuit or the arrival of the first input data (FIG. 3 is represented under such a condition), the clock component waveform c is not applied to the reset terminal R of the counter 9. However, as the high frequency clock is gated through the AND gate 7 and applied to the clock terminal C of the counter 9 reaches the predetermined count N, when the output terminal Q changes to "1," at which time the clock signal derivation operation starts.

The time required for the above operation is one to two bit periods, which is practically of no problem.

If the input data waveform a contains noises Z, they appear in the transition point signal pulse wave b as noise pulses Zp. However, those pulses can be eliminated by selecting the predetermined count N of the counter 9 to a value close to $T_D/T_C$, as seen from FIG. 3.

When the input data waveform a contains an error portion E in which regularity of coding is lost (that is, a waveform shown by a broken line should have been produced at that portion; such an error possibly occurs upon the power-on), unwanted clock components EC appear. However, as the information changes thereafter, normal clock components are restored. Accordingly, the unwanted clock components EC can be eliminated by processing the extracted clock signal in accordance with a predetermined regularity.

Figure 4:
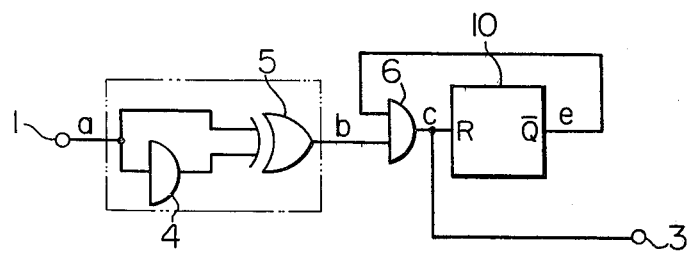
FIG. 4 shows a block diagram of another embodiment of the clock signal derivation system in accordance with the present invention.

FIG. 4 shows a block diagram of another embodiment of the clock signal derivation system of the present invention, in which numeral 10 denotes a monostable multivibrator of gating signal generating means. The other numerals denote the equivalents of the elements of the same numerals in FIG. 2.

The waveforms at points a, b, c and e are identical to the waveforms a, b, c and e shown in FIG. 3 except that an inverted output terminal $\bar{Q}$ of the monostable multivibrator 10 always assumes "1" at initial setting such as power-on.

In the embodiment of FIG. 2, the high frequency clock is counted by the counter 9 to discriminate the clock period to be extracted (generation of the gating signal) and effective ones of the transition point signal pulses are extracted to use as the clock signal. In the present embodiment, the high frequency clock is not used but a duration of an output pulse of the monostable multivibrator 10 which is triggered by the transition point signal pulse is used as a reference for the gating signal. In this manner, the clock period to be extracted is discriminated and the unwanted clock components are eliminated.

The detail of the operation is not explained here because it will be readily understood from the above description made in conjunction with FIGS. 2 and 3. The duration of the output pulse of the monostable multivibrator 10 is selected such that it is not shorter than 50% of one bit period and shorter than 100% of one bit period, in the same manner as in the selection of the predetermined count N of the counter 9 described above.

Figure 1:
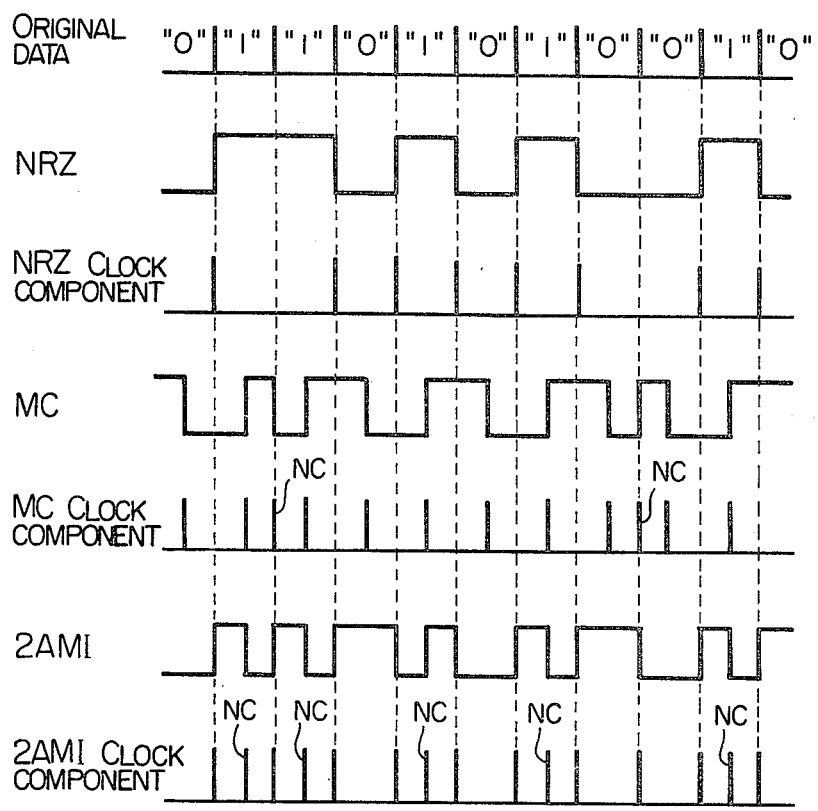
FIG. 1 shows a time chart illustrating relationships between typical coded information and clock components thereof.

While the embodiments described above use the MC as the coding form, it will be readily understood that the clock signal can be extracted from the 2AMI coded signal in a similar manner because there exists a similarity of regularity in the relationships between the data waveforms and the clock components thereof of the MC and 2AMI waveforms as is seen from the waveforms shown in FIG. 1.

The clock signal derivation system of the present invention cannot always completely eliminate the unwanted clock components, as discussed above. However, by combining with a phase lock loop circuit, a performance of the present system can be improved to such an extent that it raises no practical problem.

Figure 5:
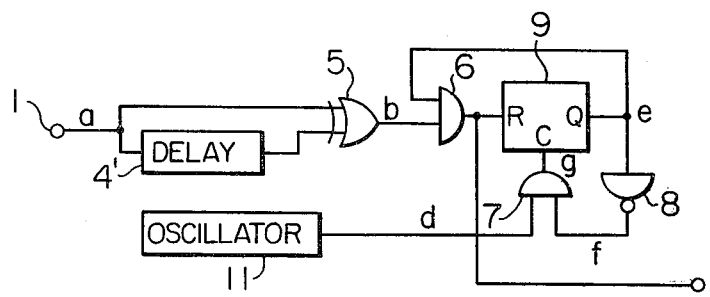
FIG. 5 shows a block diagram of a further embodiment of the clock signal derivation system of the present invention.
Figure 6:
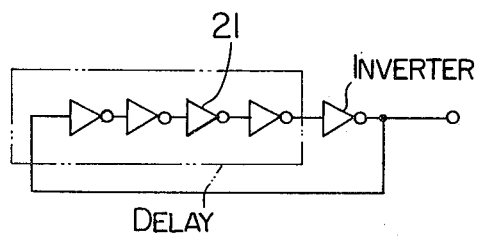
FIG. 6 shows a particular construction of a delay element used in the preferred embodiment.

FIG. 5 shows another embodiment of the clock signal derivation circuit shown in FIG. 2. A delay element 4' may be a gate circuit comprising a plurality of series-connected inverters 21 shown in FIG. 6. Numeral 11 denotes an oscillator for generating the high frequency clock (waveform d).

Figure 7:
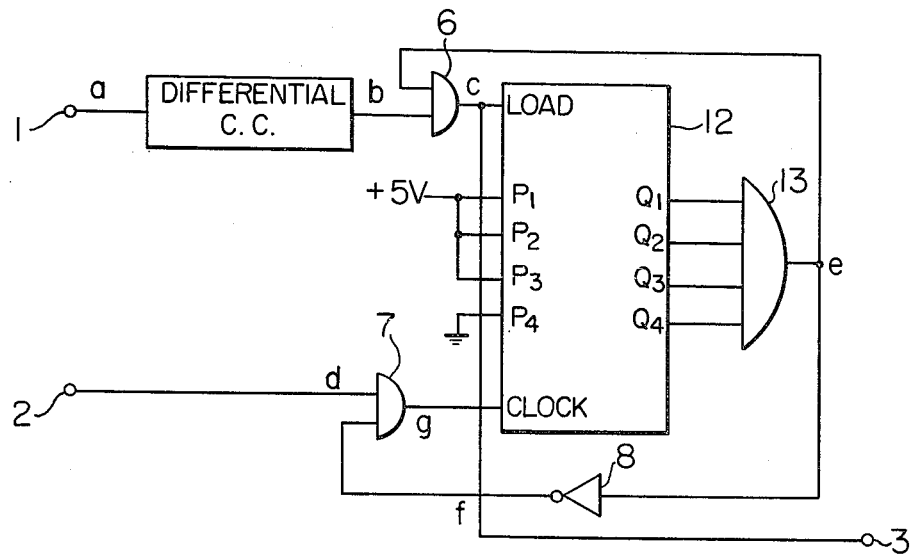
FIG. 7 shows a block diagram of a further embodiment of the clock signal derivation system which uses a programmable binary counter.

FIG. 7 shows a further embodiment for implementing the clock signal derivation system of the present invention, which utilizes a programmable binary counter 12 as the counter. A transition point signal pulse gated by the AND gate 6 with an output of a four-input AND gate 13 to which outputs $Q_1-Q_4$ of the programmable binary counter 12 is applied to a load terminal of the counter 12 instead of the reset terminal. When the transition point signal pulses which are equal in number to the count preset at terminals $P_1-P_4$ are applied to the load terminal, the preset count is produced at the output terminals $Q_1-Q_4$.

Accordingly, counting by the counter 12 is effected starting from the preset value and ending at possible maximum count. In an example shown in FIG. 7, the frequency of the high frequency clock is approximately ten times as high as the data bit rate, and the preset count is 7, the possible maximum count is 15. Therefore, the number of count available is 8.

Figure 8:
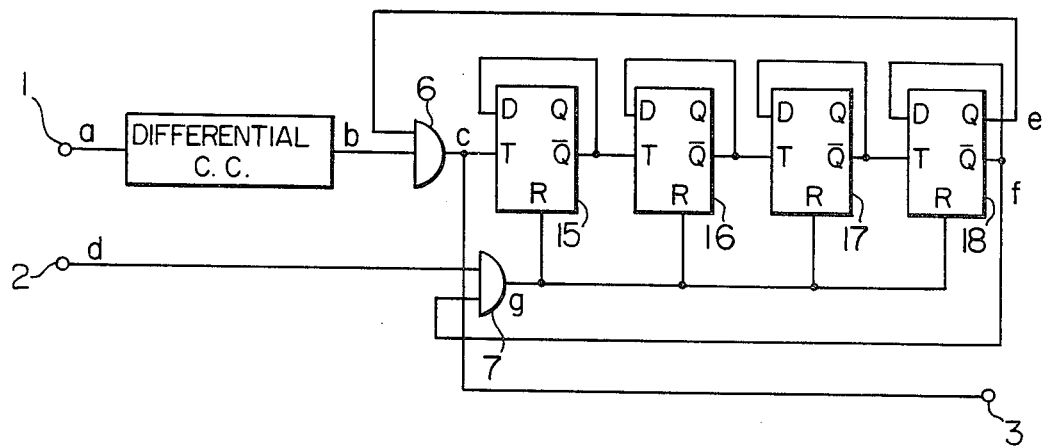
FIG. 8 shows a block diagram of a further embodiment of the clock signal derivation system which uses four D-type flip-flops.

FIG. 8 shows a clock signal derivation circuit which includes a counter (corresponding to the counter 9 shown in FIG. 2) comprising four D-type flip-flops 15–18. In the illustrated embodiment, the high frequency clock d has a frequency which is ten times as high as the data bit rate and the number of count available is eight as is the case of FIG. 7.

Figure 9:
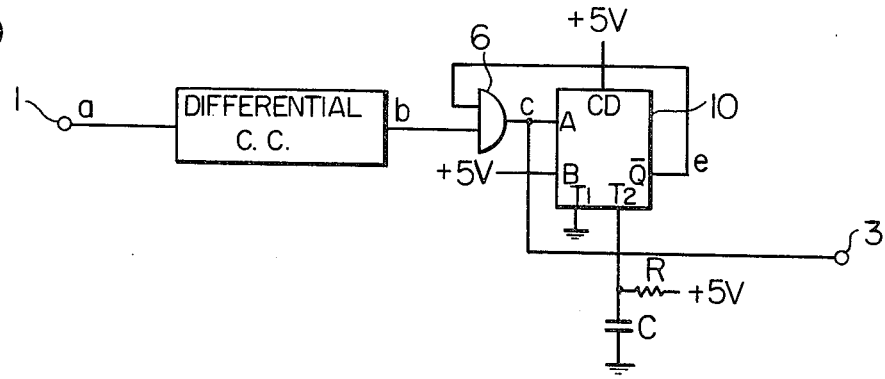
FIG. 9 shows a block diagram of a further embodiment of the clock signal derivation system which uses a monostable multivibrator in the form of MOS IC.

FIG. 9 shows a circuit configuration in which CMOS IC such as Motorola Inc. MC14538 is used as the monostable multivibrator shown in FIG. 4. The pulse duration at the output terminal $\overline{Q}$ can be determined by the selection of a CR constant.

As described hereinabove, in accordance with the present invention, the effective clock signal can be abundantly extracted from the transmission coded signal having more frequent changes in the waveform than the bit rate of the input data, such as the Manchester coded signal or the 2AMI coded signal while eliminating the unwanted clock components. Accordingly, the preformance, reliability and economy is deriving the clock signal are remarkably enhanced.

Since the embodiment shown in FIG. 2 processes the signal in digital manner throughout the system, it is suited for IC implementation and presents a further advantage.

I claim:

1. A clock signal derivation method for deriving clock information from input signal data encoded by a code having a clock frequency of twice the bit rate of said input signal data comprising the steps of producing a sequence of transition point signals representing transition points on the waveform of said input signal, generating gating signals lasting for greater than 50% of one bit period of the encoded data of said input signal and less than 100% of said one bit period from the generation of a transition point signal, and inhibiting transition point signals of said sequence which occur during generation of said gating signals to produce a modified sequence of transition point signals accurately providing said clock information, wherein said generation of said gating signals includes counting a high frequency clock signal having a higher frequency than the bit rate of the input signal data to a predetermined maximum count in response to each transition point signal of said modified sequence, and generating said gating signals during said counting and until said maximum count is reached.

2. A clock signal derivation circuit for deriving clock information from input signal data encoded by a code having a clock frequency of twice the bit rate of said input signal data, comprising means for producing transition point signals representing transition points on the waveform of said input signal; gating means connected to said transition point signal producing means and responsive to applied gating signals for blocking any transition point signal received during generation of said gating signals; gating signal generating means responsive to transition point signals passed by said gating means for generating said gating signals lasting for greater than 50% and less than 100% of one bit period of the data of said input signal, including counter means for counting a high frequency clock signal having a higher frequency than the bit rate of the input signal data to a predetermined count in response to each passed transition point signal, and means for applying the output of said counter for use as said gating signal; and output means connected to the output of said gating means for providing a sequence of transition point signals accurately representing clock information.

3. A clock signal derivation circuit according to claim 2, wherein said means for producing transition point signals includes a differentiating circuit.

4. A clock signal derivation circuit according to claim 2, wherein said counter means consists of a counter having a clock terminal, means for inverting the output signal of said counter and a first AND gate to which said high frequency clock signal and said inverted output signal of said counter are fed, the output of said first AND gate being connected to the clock terminal of said counter.

5. A clock derivation circuit according to claim 4, wherein said gating means for blocking said transition point signals consists of a second AND gate to which said transition point signals and said output from said counter are fed, said second AND gate having its output connected to a reset terminal of said counter.

6. A clock derivation circuit according to claim 5, wherein said counter is a programmable counter.

* * * * *